United States Patent
Anumakonda et al.

(10) Patent No.: US 9,122,723 B2
(45) Date of Patent: *Sep. 1, 2015

(54) APPARATUS, SYSTEM, AND METHOD FOR MEMBER MATCHING

(71) Applicant: Ingenix, Inc., Eden Prairie, MN (US)

(72) Inventors: Ravi Anumakonda, Ellicott City, MD (US); Dawn Paulinski, San Francisco, CA (US); Laurie Buchanan, Derry, NH (US); Dan Dunn, Bedford, MA (US)

(73) Assignee: OPTUMINSIGHT, INC., Eden Praire, MN (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/718,935

(22) Filed: Dec. 18, 2012

(65) Prior Publication Data

US 2013/0103709 A1 Apr. 25, 2013

Related U.S. Application Data

(63) Continuation of application No. 12/634,067, filed on Dec. 9, 2009, now Pat. No. 8,359,337.

(60) Provisional application No. 61/121,027, filed on Dec. 9, 2008.

(51) Int. Cl.
*G06F 17/30* (2006.01)

(52) U.S. Cl.
CPC .... *G06F 17/30477* (2013.01); *G06F 17/30303* (2013.01)

(58) Field of Classification Search
CPC ................... G06F 17/30563; G06F 17/30477; G06F 17/30303
See application file for complete search history.

(56) References Cited

U.S. PATENT DOCUMENTS

| | | |
|---|---|---|
| 2001/0014893 A1 | 8/2001 | Boothby ...................... 707/201 |
| 2002/0085579 A1 | 7/2002 | Sullivan et al. ............... 370/428 |
| 2002/0184170 A1 | 12/2002 | Gilbert et al. ................... 706/20 |
| 2002/0194196 A1 | 12/2002 | Weinberg et al. .......... 707/104.1 |
| 2003/0083961 A1 | 5/2003 | Bezos et al. .................... 705/27 |
| 2003/0084017 A1 | 5/2003 | Ordille ............................. 707/1 |
| 2003/0088562 A1 | 5/2003 | Dillon et al. ...................... 707/5 |
| 2003/0126156 A1 | 7/2003 | Stoltenberg et al. ....... 707/104.1 |
| 2003/0153299 A1 | 8/2003 | Perfit et al. .................... 455/410 |
| 2003/0154194 A1* | 8/2003 | Jonas ................................ 707/3 |

(Continued)

OTHER PUBLICATIONS

Semaphorecorp.com, Merge/Purge and Duplicate Detection, Oct. 17, 2001. <http://web.archive.org/web/20071017021907/http://semaphorecorp.com/mpdd/mpdd.html>.

*Primary Examiner* — Syed Hasan

(74) *Attorney, Agent, or Firm* — Norton Rose Fulbright US LLP

(57) ABSTRACT

An apparatus, system, and method for member matching. In one embodiment, the apparatus includes an input adapter, a processor, and an output adapter. The input adapter may receive a first data record from a plurality of data records stored in one or more databases. The processor may generate a first data key from one or more field values in the first data record, compare a second data key associated with a second data record with the first data key associated with the first data record, and identify a match between the first data key and the second data key. In one embodiment, the output adapter may produce an output configured to identify the first data record and the second data record in response to identification of the match.

36 Claims, 13 Drawing Sheets

(56) References Cited

U.S. PATENT DOCUMENTS

| | | | |
|---|---|---|---|
| 2003/0163778 A1 | 8/2003 | Shores et al. | 715/500 |
| 2003/0204436 A1 | 10/2003 | Flender et al. | 705/10 |
| 2003/0225729 A1 | 12/2003 | Maloche et al. | 707/1 |
| 2004/0019398 A1* | 1/2004 | Pestow et al. | 700/101 |
| 2004/0034668 A1 | 2/2004 | Gotz et al. | 707/201 |
| 2004/0036716 A1 | 2/2004 | Jordahl | 345/713 |
| 2004/0167897 A1 | 8/2004 | Kuhlmann et al. | 707/10 |
| 2004/0172393 A1 | 9/2004 | Kazi et al. | 707/6 |
| 2004/0181462 A1 | 9/2004 | Bauer et al. | 705/26 |
| 2004/0181512 A1 | 9/2004 | Burdick et al. | 707/3 |
| 2004/0224672 A1 | 11/2004 | Linkert et al. | 455/414.1 |
| 2004/0225543 A1 | 11/2004 | Kapochunas et al. | 705/7 |
| 2004/0243539 A1 | 12/2004 | Skurtovich et al. | 707/1 |
| 2005/0028046 A1 | 2/2005 | McArdle | 714/48 |
| 2005/0182774 A1 | 8/2005 | Weir et al. | 707/100 |
| 2005/0182780 A1 | 8/2005 | Forman et al. | 707/101 |
| 2005/0187794 A1 | 8/2005 | Kimak | 705/3 |
| 2005/0240569 A1 | 10/2005 | Cheng et al. | 707/3 |

* cited by examiner

APPARATUS, SYSTEM, AND METHOD FOR MEMBER MATCHING

CROSS-REFERENCE TO RELATED APPLICATIONS

This application is a continuation of U.S. application Ser. No. 12/634,067 filed on Dec. 9, 2009, which claims priority to U.S. Application No. 61/121,027 filed on Dec. 9, 2008, the entire disclosures of which are specifically incorporated herein by reference in its entirety without disclaimer.

BACKGROUND OF THE INVENTION

1. Field of the Invention

This invention relates to data management and more particularly relates to an apparatus, a system and a method for member matching.

2. Description of the Related Art

Evaluation of health care claims data at the member level is hindered by lack of access to complete information for members who move from one plan to another. This is especially problematic when the analysis is done for an individual health plan and only data from that plan is available for use. It is complicated by the fact that patients are mobile, visit multiple providers and enroll in multiple plans. The challenge is to uniquely identify members across the health plans and create non-duplicative eligibility records. This requires matching members or data records across health plans.

Typical record matching solutions require the use of a social security number or other unique identifiers that are common among the several datasets. Unfortunately, most healthcare plans and other data providers, such as financial institutions, are unwilling or unable to supply social security numbers or other unique identifiers because of privacy concerns.

The referenced shortcomings are not intended to be exhaustive, but rather are among many that tend to impair the effectiveness of previously known techniques for member matching; however, those mentioned here are sufficient to demonstrate that the methodologies appearing in the art have not been satisfactory and that a significant need exists for the techniques described and claimed in this disclosure.

SUMMARY OF THE INVENTION

From the foregoing discussion, it should be apparent that a need exists for an apparatus, system, and method for member matching.

An apparatus for member matching is presented. In one embodiment, the apparatus includes an input adapter, a processor, and an output adapter. The input adapter may receive a first data record from a plurality of data records stored in one or more databases. The processor may generate a first data key from one or more field values in the first data record, compare a second data key associated with a second data record with the first data key associated with the first data record, and identify a match between the first data key and the second data key. In one embodiment, the processor may assign a common identifier to the first data record and the second data record in response to the match between the first key and the second key, the common identifier associating the first data record and the second data record with a unique entity. In one embodiment, the output adapter may produce an output configured to identify the first data record and the second data record in response to identification of the match.

In a further embodiment, the processor may clean the first data record and the second data record before comparing the first data key and the second data key. In still a further embodiment, the processor may standardize the first and second data record before comparing the first data key and the second data key. Additionally, the processor may generate a plurality of first data keys and second data keys according to a plurality of predetermined combinations of field values. In a further embodiment, comparing the first data key and the second data key includes comparing the plurality of first data keys with the plurality of second data keys.

A system is also presented for member matching. In one embodiment, the system may include one or more data storage devices configured to store a plurality of data records. The system may also include a server configured to receive a first data record from the plurality of data records stored in one or more databases located on the one or more data storage devices, generate a first data key from one or more field values in the first data record, compare a second data key associated with a second data record with the first data key associated with the first data record, identify a match between the first data key and the second data key, and produce an output configured to identify the first data record and the second data record in response to identification of the match.

A tangible computer program product comprising a computer readable medium having computer usable program code executable to perform operations for member matching is also presented. In one embodiment, the operations include receiving a first data record from a plurality of data records stored in one or more databases, generating a first data key from one or more field values in the first data record, comparing a second data key associated with a second data record with the first data key associated with the first data record, identifying a match between the first data key and the second data key, and producing an output configured to identify the first data record and the second data record in response to identification of the match.

A method is also presented for member matching. The method in the disclosed embodiments substantially includes the steps necessary to carry out the functions presented above with respect to the operation of the described apparatus and system. In one embodiment, the method includes receiving a first data record from a plurality of data records stored in one or more databases, generating a first data key from one or more field values in the first data record, comparing a second data key associated with a second data record with the first data key associated with the first data record, identifying a match between the first data key and the second data key, and producing an output configured to identify the first data record and the second data record in response to identification of the match.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
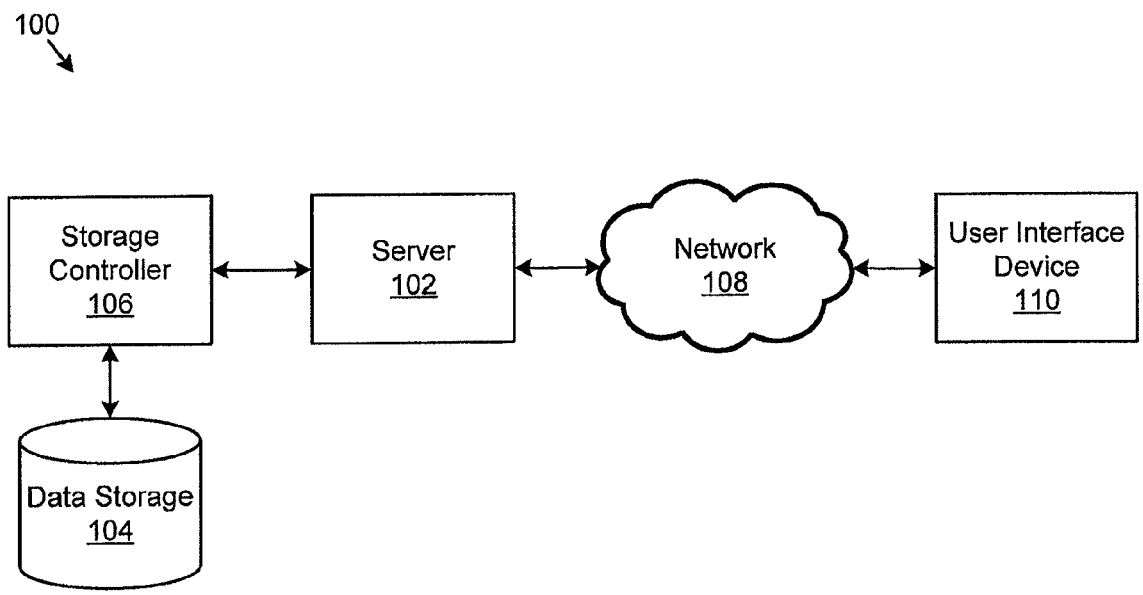
FIG. 1 is a schematic block diagram illustrating one embodiment of a system for member matching.

The invention and the various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, a procedure, or a function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for member matching. The system 100 may include a server 102, a data storage device 104, a network 108, and a user interface device 110. In a further embodiment, the system 100 may include a storage controller 106 or storage server configured to manage data communications between the data storage device 104 and the server 102 or other components in communication with the network 108. In an alternative embodiment, the storage controller 106 may be coupled to the network 108. In a general embodiment, the system 100 may compare records from one or more databases and match groups of records based on a common attribute. Specifically, the system 100 may compare healthcare records from a plurality of databases to identify a group of records associated with an individual or member of a healthcare plan.

In one embodiment, the user interface device 110 is referred to broadly and is intended to encompass a suitable processor-based device such as a desktop computer, a laptop computer, a Personal Digital Assistant (PDA), a mobile communication device or organizer device having access to the network 108. In a further embodiment, the user interface device 110 may access the Internet to access a web application or web service hosted by the server 102 and provide a user interface for enabling the service consumer (user) to enter or receive information. The user may also input a selection of field values to be used to generate the first data key, and other user inputs and controls.

The network 108 may facilitate communications of data between the server 102 and the user interface device 110. The network 108 may include any type of communications network including, but not limited to, a direct PC to PC connection, a local area network (LAN), a wide area network (WAN), a modem to modem connection, the Internet, a combination of the above, or any other communications network now known or later developed within the networking arts which permits two or more computers to communicate, one with another. In a further embodiment of the system 100, the user interface device 110 and/or the network 108 may be omitted.

In one embodiment, the server 102 is configured to select a first data record from a plurality of data records stored in one or more databases, generate a first data key from one or more field values in the first data record, compare a second data key associated with a second data record with the first data key associated with the first data record, identify a match between the first data key and the second data key, and produce an output configured to identify the first data record and the second data record in response to identification of the match. Additionally, the server may access data stored in the data storage device 104 via a Storage Area Network (SAN) connection, a LAN, a data bus, or the like.

The data storage device 104 may include a hard disk, including hard disks arranged in a Redundant Array of Independent Disks (RAID) array, a tape storage drive comprising a magnetic tape data storage device, an optical storage device, or the like. In one embodiment, the data storage device 104 may store health related data, such as insurance claims data, consumer data, or the like. The data may be arranged in a database and accessible through Structured Query Language (SQL) queries, or other data base query languages or operations.

Figure 2:
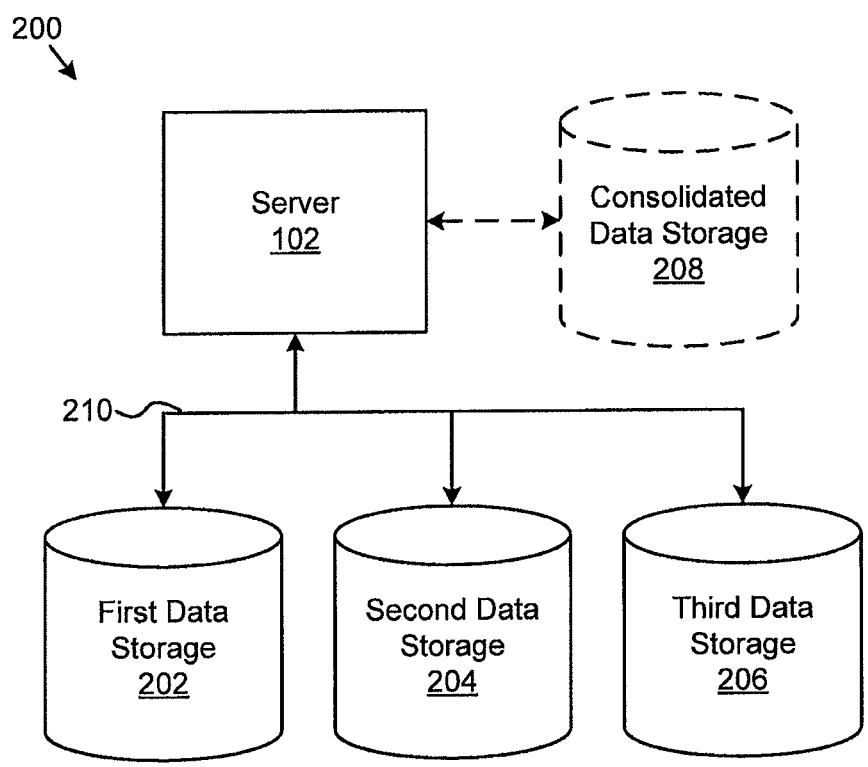
FIG. 2 is a schematic block diagram illustrating one embodiment of a database system for storing data records.

FIG. 2 illustrates one embodiment of a data management system 200 configured to store and manage data for member matching. In one embodiment, the system 200 may include a server 102. The server 102 may be coupled to a data-bus 202. In one embodiment, the system 200 may also include a first data storage device 204, a second data storage device 206 and/or a third data storage device 208. In further embodiments, the system 200 may include additional data storage devices (not shown). In such an embodiment, each data storage device 204-208 may host a separate database of data records. The data records may include healthcare insurance claims data, consumer data, socioeconomic data, financial data, or the like. In a particular embodiment, the data records may include insurance claims data related to individuals from multiple sources, including pharmacies, hospitals, clinics, doctor's offices, urgent care centers, or the like. In a further embodiment, the data records may include insurance claims information from multiple insurance organizations, including Medicare, Medicaid, secondary insurers, or a variety of private insurers. The customer information in each database may be keyed to a common field or identifier, such as an individual's name, social security number, customer number, or the like. Alternatively, the storage devices 204-208 may be arranged in a RAID configuration for storing redundant copies of the database or databases through either synchronous or asynchronous redundancy updates.

In one embodiment, the server 102 may perform the methods described herein on selected data storage devices 204-206 to collect a consolidated set of data elements associated with an individual or group of individuals. The server 102 may store the consolidated data set in a consolidated data storage device 208. In such an embodiment, the server 102 may refer back to the consolidated data storage device 208 to obtain a set of data elements associated with a specified individual. In another alternative embodiment, multiple databases may be stored on a single consolidated data storage device 208.

In various embodiments, the server 102 may communicate with the data storage devices 204-208 over the data-bus 202. The data-bus 202 may comprise a SAN, a LAN, or the like. The communication infrastructure may include Ethernet, Fibre-Chanel Arbitrated Loop (FC-AL), Small Computer System Interface (SCSI), and/or other similar data communication schemes associated with data storage and communication. For example, there server 102 may communicate indirectly with the data storage devices 204-208; the server first communicating with a storage server or storage controller 106.

In one example of the system 200, the first data storage device 204 may store data associated with a first private insurer, including insurance claims made by one or more individuals. The insurance claims data may include data associated with medical services, procedures, and prescriptions utilized by the individual. In one embodiment, the second data storage device 206 may store insurance claims data from a state or federal government health insurance program, such as Medicare or Medicaid. The third data storage device 208 may store health insurance information from a secondary insurer. For example, the third data storage device 208 may include data associated with supplemental pharmacy claims, dental insurance, vision insurance, or the like.

The server 102 may host a software application configured for member matching. The software application may further include modules or functions for interfacing with the data storage devices 204-208, interfacing a network 108, interfacing with a user, and the like. In a further embodiment, the server 102 may host an engine, application plug-in, or application programming interface (API). In another embodiment, the server 102 may host a web service or web accessible software application.

In a specific embodiment, a data record may include one or more data fields. For example, the data record may include data fields associated with an individual's first, middle, and last names. The data record may also include a data field associated with a date of birth and/or gender of the individual. The data fields may also include fields for contact information, including address, city, state, zip code, telephone number, and the like. The data fields may also include the individual's coverage effective and end dates. The data fields may also include a date and/or description of a service provided, and a designation of the health plan to which the claim was made.

Figure 3:
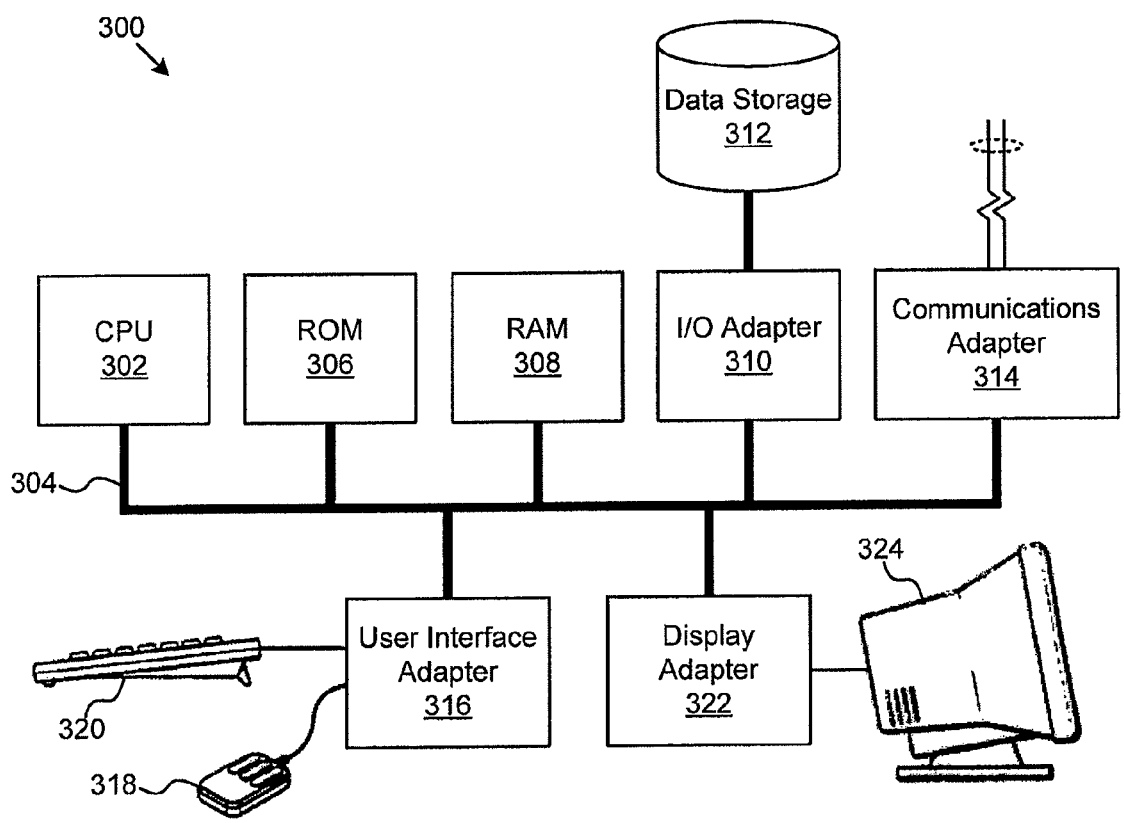
FIG. 3 is a schematic block diagram illustrating one embodiment of a computer system that may be used in accordance with certain embodiments of the system for member matching.

FIG. 3 illustrates a computer system 300 adapted according to certain embodiments of the server 102 and/or the user interface device 110. The central processing unit (CPU) 302 is coupled to the system bus 304. The CPU 302 may be a general purpose CPU or microprocessor. The present embodiments are not restricted by the architecture of the CPU 302, so long as the CPU 302 supports the modules and operations as described herein. The CPU 302 may execute the various logical instructions according to the present embodiments. For example, the CPU 302 may execute machine-level instructions according to the exemplary operations described below with reference to FIGS. 7-11.

The computer system 300 also may include Random Access Memory (RAM) 308, which may be SRAM, DRAM, SDRAM, or the like. The computer system 300 may utilize RAM 308 to store the various data structures used by a software application configured to member matching. The computer system 300 may also include Read Only Memory (ROM) 306 which may be PROM, EPROM, EEPROM, or the like. The ROM may store configuration information for booting the computer system 300. The RAM 308 and the ROM 306 hold user and system 100 data.

The computer system 300 may also include an input/output (I/O) adapter 310, a communications adapter 314, a user interface adapter 316, and a display adapter 322. The I/O adapter 310 and/or user the interface adapter 316 may, in certain embodiments, enable a user to interact with the computer system 300 in order to input information for authenticating a user, identifying an individual, or receiving health profile information. In a further embodiment, the display adapter 322 may display a graphical user interface associated with a software or web-based application for member matching.

The I/O adapter 310 may connect to one or more storage devices 312, such as one or more of a hard drive, a Compact Disk (CD) drive, a floppy disk drive, a tape drive, to the computer system 300. The communications adapter 314 may be adapted to couple the computer system 300 to the network 106, which may be one or more of a LAN and/or WAN, and/or the Internet. The user interface adapter 316 couples user input devices, such as a keyboard 320 and a pointing device 318, to the computer system 300. The display adapter 322 may be driven by the CPU 302 to control the display on the display device 324.

The present embodiments are not limited to the architecture of system 300. Rather the computer system 300 is provided as an example of one type of computing device that may be adapted to perform the functions of server 102 and/or the user interface device 110. For example, any suitable processor-based device may be utilized including without limitation, including personal data assistants (PDAs), computer game consoles, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

Figure 4:
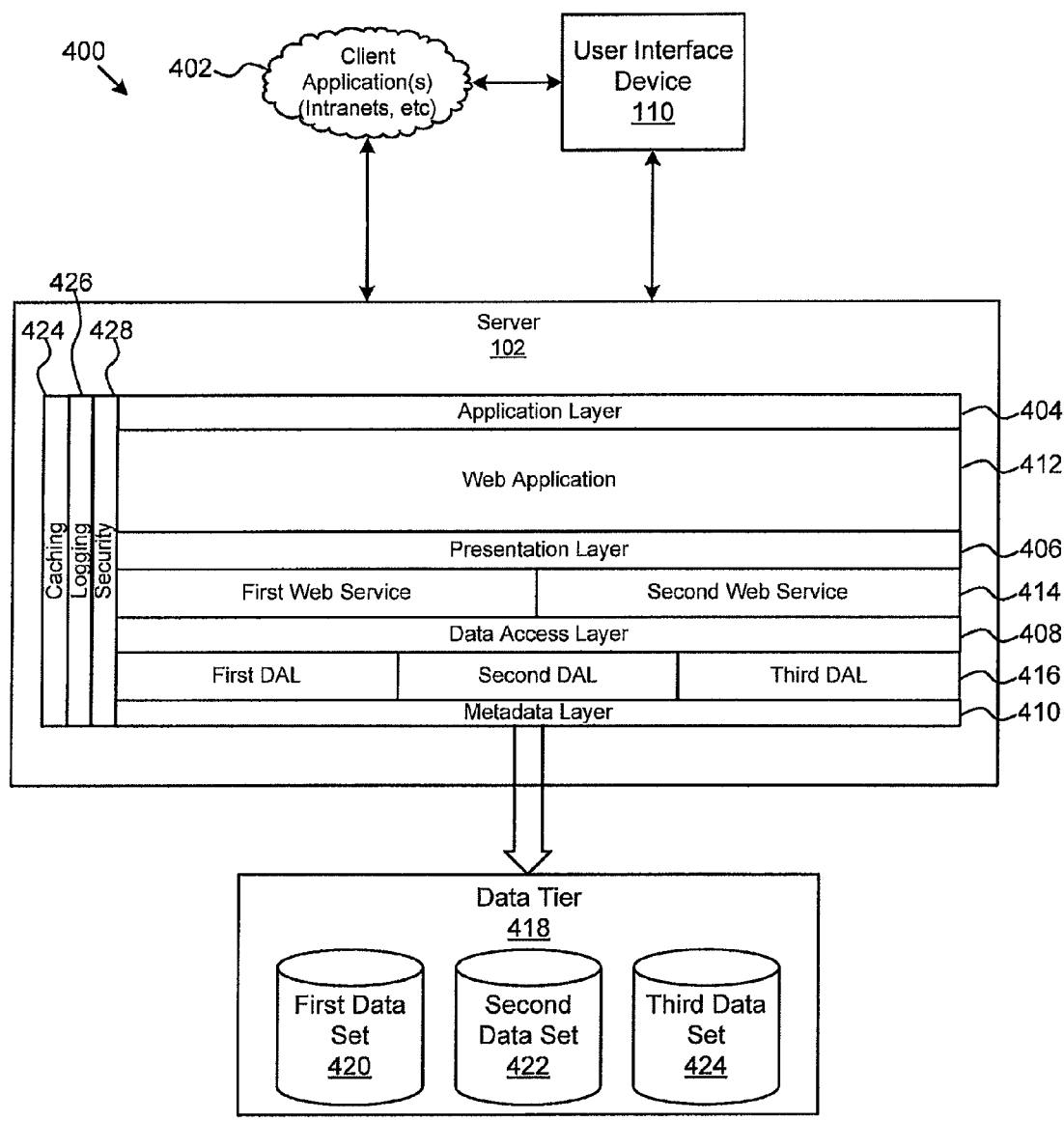
FIG. 4 is a schematic logical diagram illustrating the various layers of operation in a system for member matching.

FIG. 4 illustrates one embodiment of a network-based system 400 for member matching. In one embodiment, the network-based system 400 includes a server 102. Additionally, the network-based system 400 may include a user interface device 110. In still a further embodiment, the network-based system 400 may include one or more network-based client applications 402 configured to be operated over a network 108 including an intranet, the Internet, or the like. In still another embodiment, the network-based system 400 may include one or more data storage devices 104.

The network-based system 400 may include components or devices configured to operate in various network layers. For example, the server 102 may include modules configured to work within an application layer 404, a presentation layer 406, a data access layer 408 and a metadata layer 410. In a further embodiment, the server 102 may access one or more data sets 420-424 that comprises a data layer or data tier 412. For example, a first data set 418 a second data set 420 and a third data set 422 may comprise data tier 412 that is stored on one or more data storage devices 204-206.

One or more web applications 412 may operate in the application layer 404. For example, a user may interact with the web application 412 though one or more I/O interfaces 318, 320 configured to interface with the web application 412 through an I/O adapter 310 that operates on the application layer. In one particular embodiment, a web application 412 may be provided for member matching that includes software modules configured to perform the steps of selecting a first data record from a plurality of data records stored in one or more databases, generating a first data key from one or more field values in the first data record, comparing a second data key associated with a second data record with the first data key associated with the first data record, identifying a match between the first data key and the second data key, and producing an output configured to identify the first data record and the second data record in response to identification of the match.

In a further embodiment, the server 102 may include components, devices, hardware modules, or software modules configured to operate in the presentation layer 406 to support one or more web services 414. For example, a web application 412 may access a web service 414 to perform one or more web-based functions for the web application 412. In one embodiment, a web application 412 may operate on a first server 102 and access one or more web services 414 hosted on a second server (not shown) during operation.

For example, a web application 412 for matching diverse records associated with a common individual, or other information may access a first web service 414 for cleaning the first data record and the second data record before comparing the first data key and the second data key and a second web service 414 for standardizing the first and second data records before comparing the first data key and the second data key. The web services 414 may receive the first data record and the second data record from the data storage device 104. In response, the web service 414 may return data cleaned and/or standardized data records. One of ordinary skill in the art will recognize various web-based architectures employing web services 414 for modular operation of a web application 412.

In one embodiment, a web application 412 or a web service 414 may access one or more of the data sets 420-424 through the data access layer 408. In certain embodiments, the data access layer 408 may be divided into one or more independent data access layers 416 for accessing individual data sets 420-424 in the data tier 412. These individual data access layers 416 may be referred to as data sockets or adapters. The data access layers 416 may utilize metadata from the metadata layer 410 to provide the web application 412 or the web service 414 with specific access to the data tier 418.

For example, the data access layer 416 may include operations for performing a query of the data sets 420-424 to retrieve specific information for the web application 412 or the web service 414. In a more specific example, the data access layer 416 may include a query for a preselected group of records or all records stored in the data sets 420-424.

Figure 5:
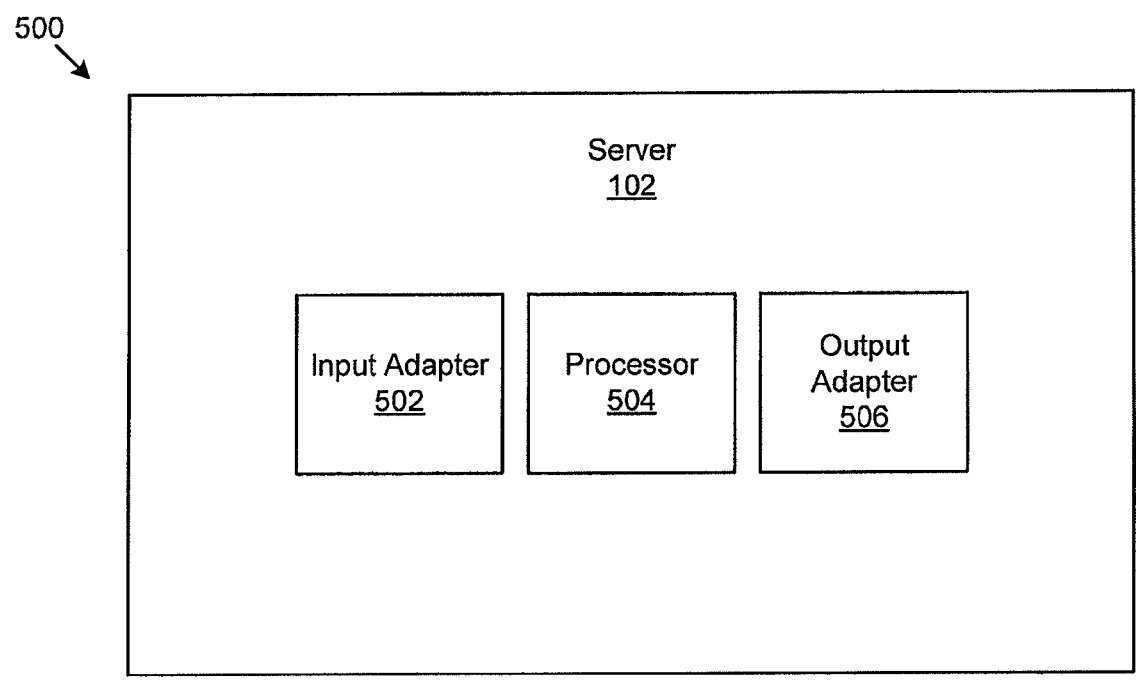
FIG. 5 is a schematic block diagram illustrating one embodiment of an apparatus for member matching.

FIG. 5 illustrates one embodiment of an apparatus 500 for member matching. In one embodiment, the apparatus 500 is a server 102 configured to load and operate software modules 502-506 configured for member matching. Alternatively, the apparatus 500 may include hardware modules 502-506 configured with analogue or digital logic, firmware executing FPGAs, or the like configured to receive a first data record from the plurality of data records stored in one or more databases located on the one or more data storage devices, generate a first data key from one or more field values in the first data record, compare a second data key associated with a second data record with the first data key associated with the first data record, identify a match between the first data key and the second data key, and produce an output configured to identify the first data record and the second data record in response to identification of the match. In such embodiments, the apparatus 500 may include an input adapter, a processor, and an output adapter.

The input adapter 502 may include an I/O adapter 310, a communications adapter 314, a user interface adapter 316, or the like. The processor 504 may include the CPU 302 as described above with relation to FIG. 3. Alternatively, the processor 504 may include other hardware components including a firmware or software-based programmable logic chip, a microprocessor, or the like. The output adapter 506 may include the I/O adapter 310, the communication adapter 314, the display adapter 322, or the like. For example, the output adapter 506 may store a map file to the data storage 312 comprising a map or listing of matched data records. In one embodiment, the output may include the matched data records. In an alternative embodiment, the output may include metadata identifying the matched data records.

Figure 6:
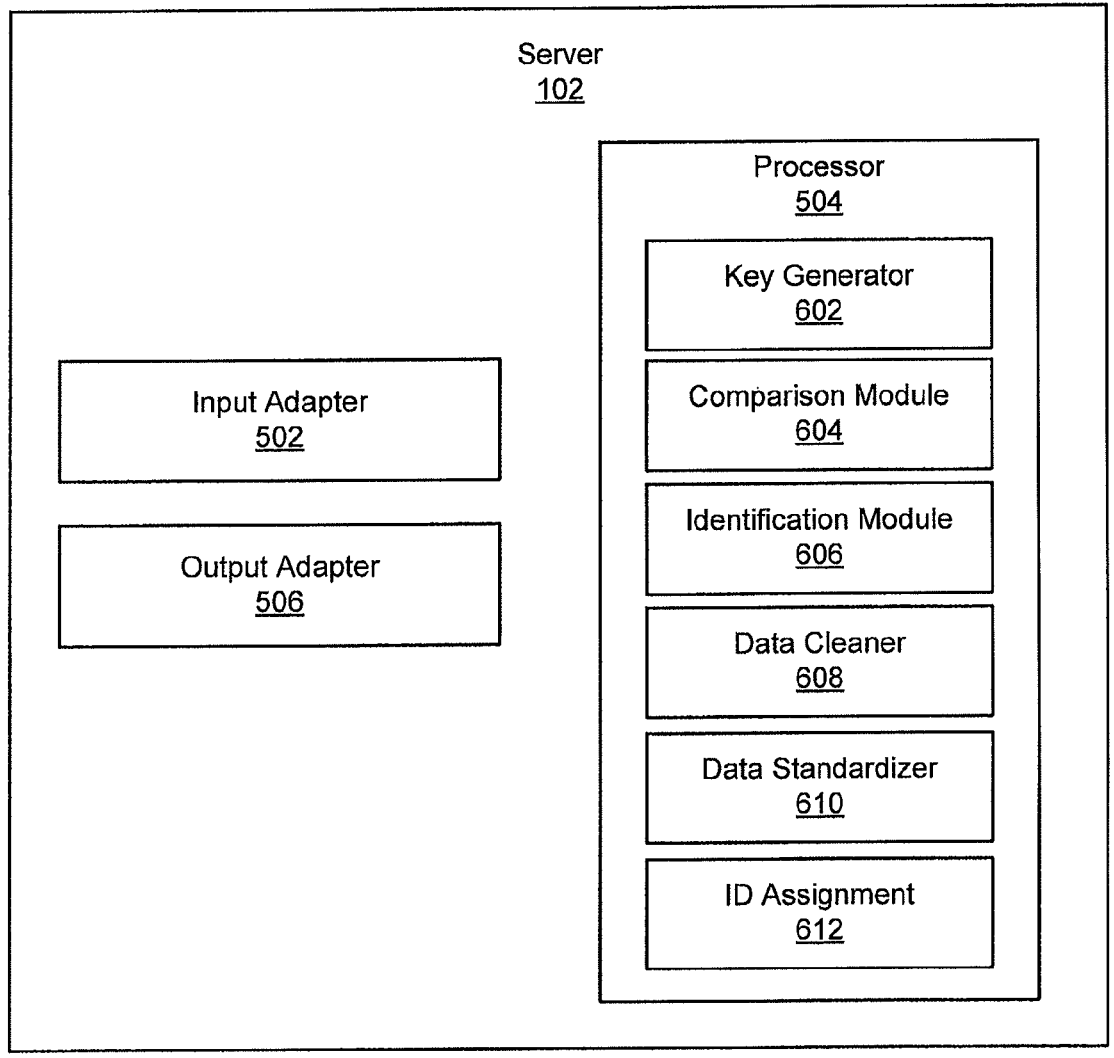
FIG. 6 is a detailed schematic block diagram illustrating one embodiment of an apparatus for member matching.

FIG. 6 illustrates a further embodiment of an apparatus 600 for member matching. The apparatus 600 may include a server 102 as described in FIG. 5. In a further embodiment, the processor 504 may include one or more software defined modules configured to execute operations for generating a first data key from one or more field values in the first data record, comparing a second data key associated with a second data record with the first data key associated with the first data record, and identifying a match between the first data key and the second data key. These modules may include a key generator 602, a comparison module 604, and an identification module 606 respectively.

In a further embodiment, the key generator 602 may generate a plurality of first data keys and second data keys according to a plurality of predetermined combinations of field values. Similarly, the comparison module 604 may compare the first data key and the second data key includes comparing the plurality of first data keys with the plurality of second data keys. For example, Table 1 includes several example embodiments of data keys that may be generated by the key generator 602. The "(v)" notation indicates that the field values may have been cleaned and/or standardized. The list in Table 1 is not intended to be an exhaustive list of possible keys that may be generated, but only indented to provide several examples for illustrative purposes only.

TABLE 1

Example data keys.

Address + Zip + Sex + DOB(v) + FirstNm(v) + LastNm(v)
Address + Zip + DOB + FirstNm(v) + LastNm(v)
Address + Sex + DOB + FirstNm(v) + LastNm(v)
Address + Zip + Sex + FirstNm(v) + LastNm(v)
Address + DOB + FirstNm(v) + LastNm(v)
Address + Zip + FirstNm(v) + LastNm(v)
Address + Sex + FirstNm(v) + LastNm(v)
Zip + Sex + DOB + FirstNm(v) + LastNm(v)
Zip + DOB + FirstNm(v) + LastNm(v)
Sex + DOB + FirstNm(v) + LastNm(v) + MiddleInit
DOB + FirstNm(v) + LastNm(v)
Phone + DOB + FirstInit + LastNm
Phone + DOB + FirstNm + MiddleInit where Sex = 'F'

In a further embodiment, the processor 504 may include additional modules. For example the processor 504 may include a data cleaner 608 configured to clean the first data record and the second data record before comparing the first data key and the second data key. For example, the data cleaner 608 may remove special characters such as '-' from names. The data cleaner 608 may also remove special characters such as '/', '-', etc. from addresses. Additionally, the data cleaner 608 may remove spaces in names and addresses. In still another embodiment, the data cleaner 506 may convert all fields into upper case. The data cleaner 608 may also edit SSNs to ensure their validity. For example, an SSN like '111-11-1111' may be identified as an invalid SSN. A leading zero may be added to SSNs with only eight digits.

In one embodiment, the processor 504 may include a data standardizer 610 configured to standardize the first and second data record before comparing the first data key and the second data key. In one embodiment, the standardizer 610 may perform a phonetic name matching algorithm. For example, the standardizer 610 may use the Soundex® algorithm available with Statistical Analysis Software (SAS). In such an embodiment, names such as "Bryan" and "Brian" may have the same encrypted value of "B65." The standardizer 610 may also standardize first and last names, for example the names "Jonathon," "John," and "Jon" may all be assigned to "Jon" to avoid confusion based on name variation. Street names may also be standardized. For example, "Avenue" may be assigned reassigned as "AVE." First and last names may be swapped, for example to capture people with two first names, foreign names, or to correct for data entry errors. In a further embodiment, the standardizer 610 may generate a substring of the first 3 characters of each name to minimize errors in spelling. Table 2 illustrates several example embodiments of variations that may be generated through the data cleaning and standardization processes described above.

TABLE 2

Exemplary variations of data cleaning and standardization results.

| VALUE | VARIATIONS |
| --- | --- |
| 23 Forest Ave | 23 FOREST AVENUE |
|  | 23 FOREST AVE |
| High land | HIGHLAND |
| Bobby Smyth | BOB SMITH |
|  | BOB SMYTH |
|  | ROBERT SMITH |
|  | ROBERT SMYTH |
|  | BOBBY SMITH |
|  | BOBBY SMYTH |
| 77 Ingle-Wood St | 77 INGLEWOOD ST |
|  | 77 INGLEWOOD STREET |

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

In still a further embodiment, the processor 504 may include an ID assignment module 612 configured to assign a common identifier to one or more matching records that have been identified by the identification module 606. Specifically, the ID assignment module 612 may assign a common identifier to the first data record and the second data record in response to the match between the first key and the second key, the common identifier associating the first data record and the second data record with a unique entity. The common identifier may be unique to the entity. An entity may include an individual, a company, an organization, a plan, or the like. For example, the ID assignment module 612 may assign a ID number, a unique user-name, an alpha-numeric identifier, a binary identifier, a hexadecimal identifier, or the like. The For example, Table 3 illustrates one embodiment of a group of data records associated with a hypothetical pair of individuals, Sally Jones and John Smith. In this example, the individuals are divorced and have one child named Bobby Smith. To further illustrate the present embodiments, this example assumes that Sally used the name Sally Smith and was covered under John's health insurance plan during the time that they were married, but Sally changed her name to Sally Jones after the divorce. This example further assumes that John and Sally are currently covered under separate health insurance plans and that Bobby is covered by both plans. This example is not intended to limit the present embodiments in any way, but to provide an illustrative example of how the present apparatus, system, and methods may match health insurance records. This example would not require the use of social security numbers or other identification numbers for matching the records.

TABLE 3

Exemplary data records.

| | |
|---|---|
| Jan. 27, 2005—PCP visit | Jul. 10, 2005—ER visit |
| Sally Smith | Bob Smith |
| DOB: Mar. 2, 1957 | DOB: Sep. 17, 1989 |
| Sex: F | Sex: M |
| Address: 23 Forest Ave, High land, MA, 02127 | Address: 23 Forest Ave, Highland, MA, 02127 |
| Phone: 781-223-2456 | Phone: 617-888-8989 |
| Health Plan: BCBSMA | Health Plan: BCBSMA |
| Feb. 23, 2005—Orthopedic visit | Nov. 14, 2005—Prescription refill |
| Sally Smith | Bobby Smyth |
| DOB: Mar. 2, 1957 | DOB: Sep. 17, 1989 |
| Sex: F | Sex: M |
| Address: 23 Forest Avenue, Highland, MA, 02127 | Address: 77 Inglewood St, Bloomingdale, MA 02231 |
| Phone: 781-223-2456 | Phone: 781-223-2456 |
| Health Plan: BCBSMA | Health Plan: UHC |
| May 18, 2005—Lab test | |
| Sally Jones | |
| DOB: Mar. 2, 1957 | |
| Sex: F | |
| Address: 77 Ingle-wood St, Bloomingdale, MA 02231 | |
| Phone: 781-223-2456 | |
| Health Plan: UHC | | common identifier may include a social security number, a member identification number associated with a member of a healthcare plan, or the like. In a particular embodiment, each matched records associated with a particular individual or member of a healthcare plan may be assigned the same member ID by the ID assignment module 612. In such an embodiment, subsequent record matching searches may be simplified by matching certain records by member ID prior to the member matching process described in FIG. 7.

Figure 7:
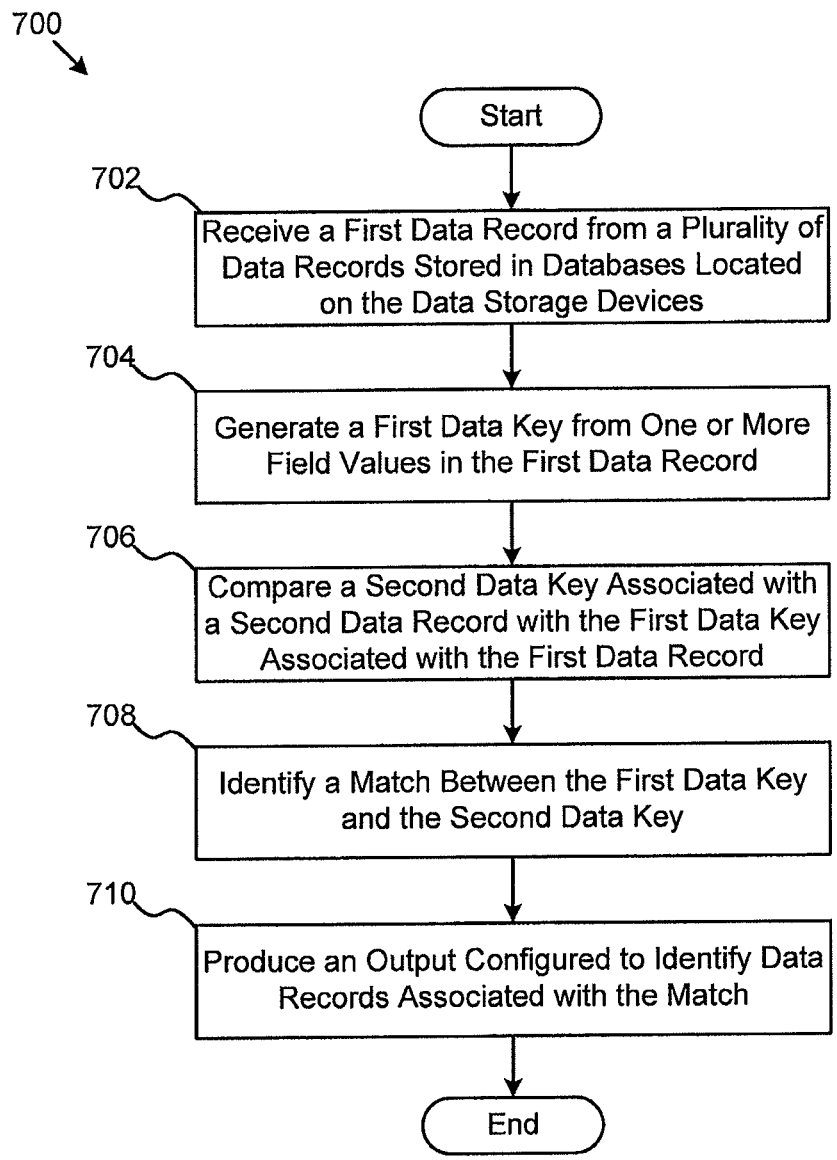
FIG. 7 is a schematic flowchart diagram illustrating one embodiment of a method for member matching.

FIG. 7 illustrates one embodiment of a method 700 for member matching. In one embodiment, the method 700 starts when the input adapter 502 receives 702 a first data record from a plurality of data records stored in databases located on the data storage devices 202-206. The key generator 602 may then generate 704 a first data key from one or more field values in the first data record. Example data keys that may be generated 704 by the key generator 602 are shown above in Table 1.

The comparison module 604 may then compare 706 a second data key associated with a second data record with the first data key associated with the first data record. The identification module 606 may then identify 708 a match between the first data key and the second data key. In response to a match identified by the identification module 606, the output adapter 506 may produce 710 an output configured to identify data records associated with the match.

In this example, the data records may be stored in two separate databases, each stored on a separate data storage device 202, 204. In such an embodiment, the input adapter 502 may receive 702 the first data record from the database stored on the first data storage device 202. In a further embodiment, the data cleaner 608 may remove extraneous markings and spaces from the data fields and the data standardizer 610 may generate a list, table, or file of standardized variations. The key generator 602 may then generate 704 a first data key from one or more field values in the first data record. For example, the key generator 602 may generate the "Address+Zip+Sex+DOB(v)+FirstNm(v)+LastNm(v)" key based on values of data fields from the first data record. In this example, the "Address+Zip+Sex+DOB(v)+FirstNm(v)+LastNm(v)" key may be "23FORESTAVENUE02127F03021957SALLYSMITH."

The comparison module 604 may then compare 706 a second data key associated with the second data record with the first data key associated with the first data record. In such an embodiment, the second data key may be generated 704 in the same or similar manner as described for generating 704 the first data key. For example, the "Address+Zip+Sex+DOB (v)+FirstNm(v)+LastNm(v)" data key for the second data record may also be "23FORESTAVENUE02127F03021957SALLYSMITH." In this example, the identification module 606 may identify 708 a match between the first data key and the second data key.

The output adapter 506 may then produce 710 an output configured to identify data records associated with the match. For example, the output may include a file containing the first data record and the second data record. Alternatively, the output may include a string of pointers, each pointer configured to indicate a position on the first data storage device 202 and/or the second data storage device 204 at which the first and second data records may be located. In a further alternative embodiment, the output may include a list of database index values or other data record identifiers for locating the first data record and the second data record within one or more databases.

In the example described above, a "Address+Zip+Sex+ DOB(v)+FirstNm(v)+LastNm(v)" data key associated with the first data record and the third data record may not match. In such an embodiment, the key generator 602 may generate 704 a plurality of data keys as described in Table 1. The comparison module 604 may then compare 706 multiple data keys associated with the first data record and the second data record. In this example, the identification module may identify a match based on the "Sex+DOB+FirstNm(v)+LastNm (v)" data key and other possible data keys. Thus, the "Sex+ DOB+FirstNm(v)+LastNm(v)" data key may account for changes of address.

Figure 8:
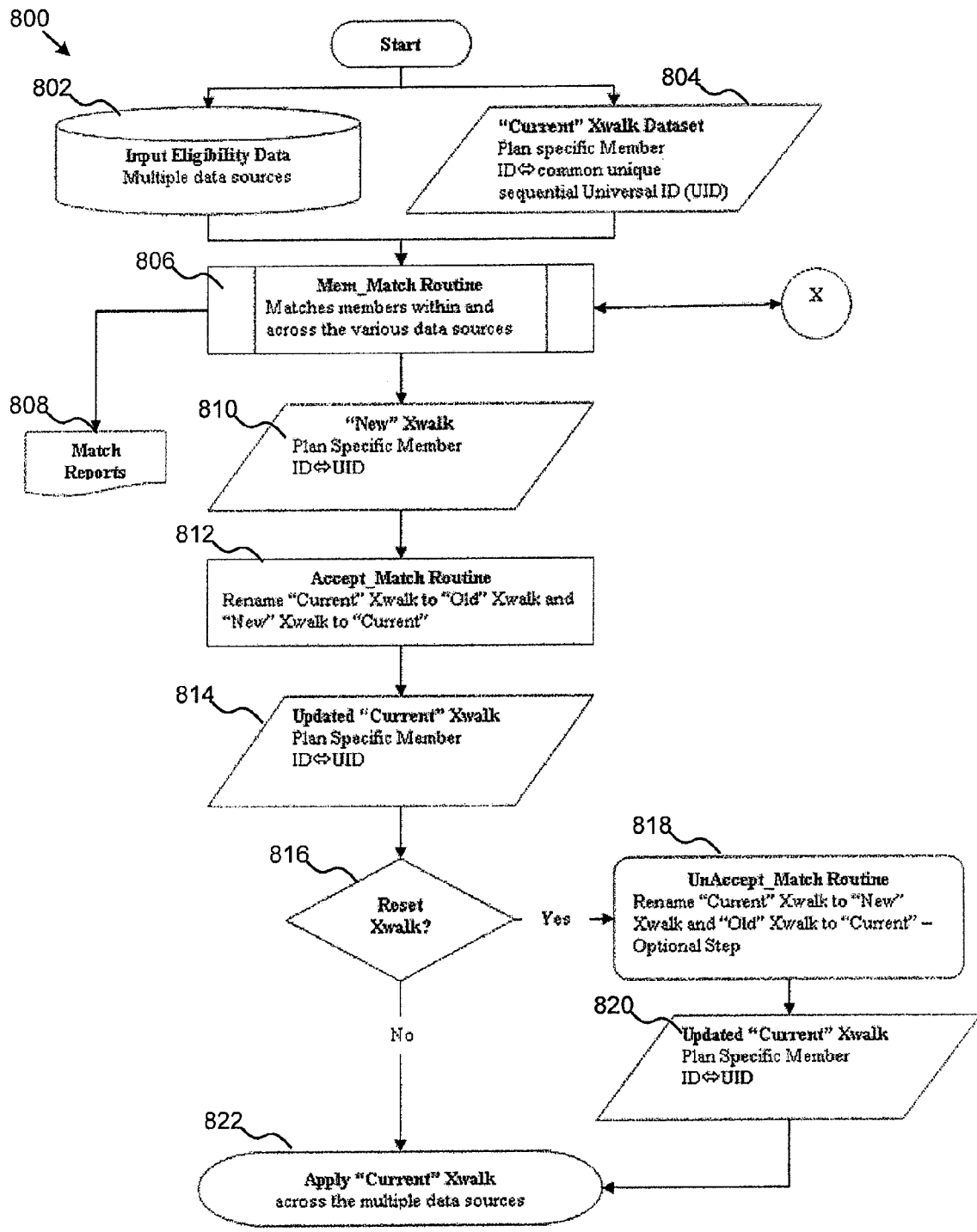
FIG. 8 is a high-level schematic flowchart diagram illustrating one embodiment of a process for member matching.

FIG. 8 is a high-level schematic flowchart diagram illustrating one embodiment of a method 800 for member matching. In particular, the method 800 illustrates one embodiment of a method for receiving 802 data records from multiple data sources. In such an embodiment, the data records received from multiple data sources may be stored in a consolidated data storage device 208. The method 800 may also receive 804 data records from a "current" Xwalk dataset which include data records are associated with plan specific member IDs, wherein the plan specific member IDs are assigned corresponding common unique sequential universal IDs (UID) by previous member matching processes or cycles.

The method 800 may further include calling a sub-process, sub-routine, web service, or the like for performing a member matching routine 806 that matches members within and across the various data sources. The routine may be excused by an iterative process flow 900 started by X and illustrated in FIG. 9. The member matching routine may return 808 one or more member matching reports and/or generate 810 an output configured to identify matching data records. In the depicted embodiment, the output may be a file or data structure referred to herein as an "Xwalk." The Xwalk may link data records that match a single individual. In this embodiment, the member matching routine 806 may generate 810 a "New" Xwalk. In particular, the method 800 may achieve universal ID (UID) persistence across runs by updating Xwalk files or datasets to keep track of new members that are being added to the system as well as members that are dropped. For example, the method 800 may accept 812 the results of the member match routine 806, as exemplified by renaming "Current" Xwalk in 804 from previous run to "Old" Xwalk and "New" Xwalk in 810 with new results to "Current" Xwalk. The method 800 may further generate 814 updated "current" Xwalk by assigning UIDs to plan specific member IDs. In the decision juncture 816 of resetting Xwalk, if the answer is "Yes," the method 800 may be followed by unacceptance of match routine by renaming "current" Xwalk to "New" Xwalk and "Old" Xwalk to "current" Xwalk as an optional step so as to generate 820 updated "current" Xwalk. If the answer is "No" for 816, the method 800 may continue by applying 822 "Current" Xwalk across the multiple data sources.

Figure 9:
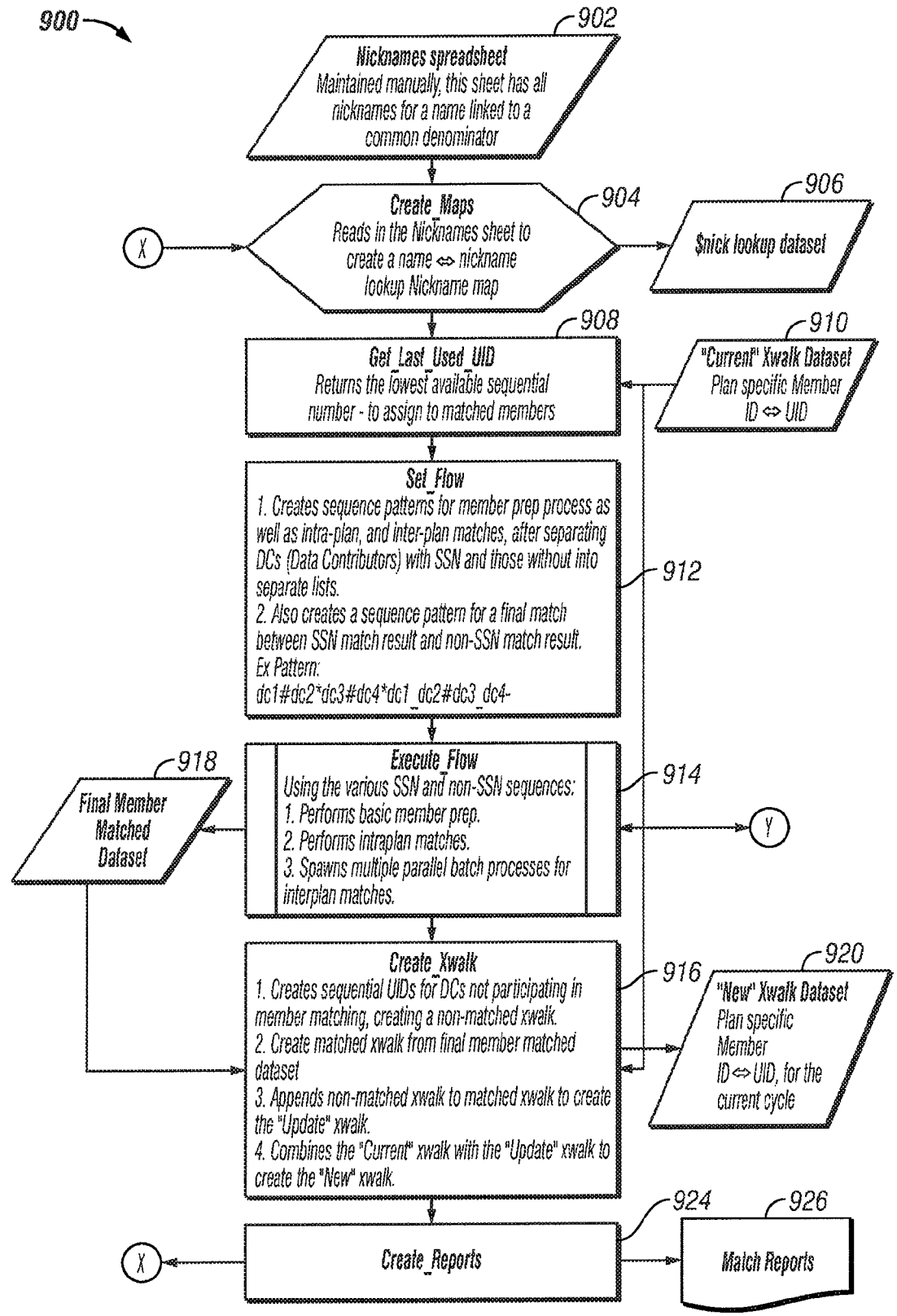
FIG. 9 is a schematic flowchart diagram illustrating one embodiment of a sub-process for member matching (mem_match routine)

FIG. 9 is a schematic flowchart diagram illustrating one embodiment of a sub-process 900 for preparing one or more data records, setting up the binary tree flow for member matching the various data sources, executing such an order (1000, 1100), and generating the universal IDs to be assigned to plan specific member ID in XWalk and other reports. In the depicted embodiment, the sub-process 900 may include creating 904 a map of names and nicknames from Nicknames spreadsheet 902 and iteratively updated by steps 904-924. The nicknames may be stored in a spreadsheet of nicknames such as Nicknames spreadsheet 902 which may be maintained manually and may have all nicknames for a name linked to a common denominator, and the map created in 904 may be stored as a nickname lookup dataset 906. In this embodiment, the nickname lookup dataset is called "$nick lookup dataset."

The sub-process 900 may further include obtaining 908 previously used UIDs for healthplan specific member identification numbers from a previous version(cycle) of the Xwalk dataset, for example from the "Current" Xwalk Dataset 910 to get last used UIDs. The sub-process 900 may the continue with the Set Flow process 912. The data source list (Data contributions (DC)) may be separated into SSN and non-SSN lists. The Set Flow process 912 may include creating sequence patterns from member prep process and intra-plan, and inter-plan matches, after separating the DCs into separate lists. In one embodiment, each of these lists may be organized into an ascending sequence based on size and then set into sequence patterns using a binary tree approach for efficient member matching. Other sequence patterns may be used, including a descending sequence, a temporal-based sequence, or the like. The Set Flow process 912 may also create a sequence pattern for a final match 1038 between SSN match result 1020 and non-SSN match result 1032 as illustrated and described in FIG. 10.

Figure 10:
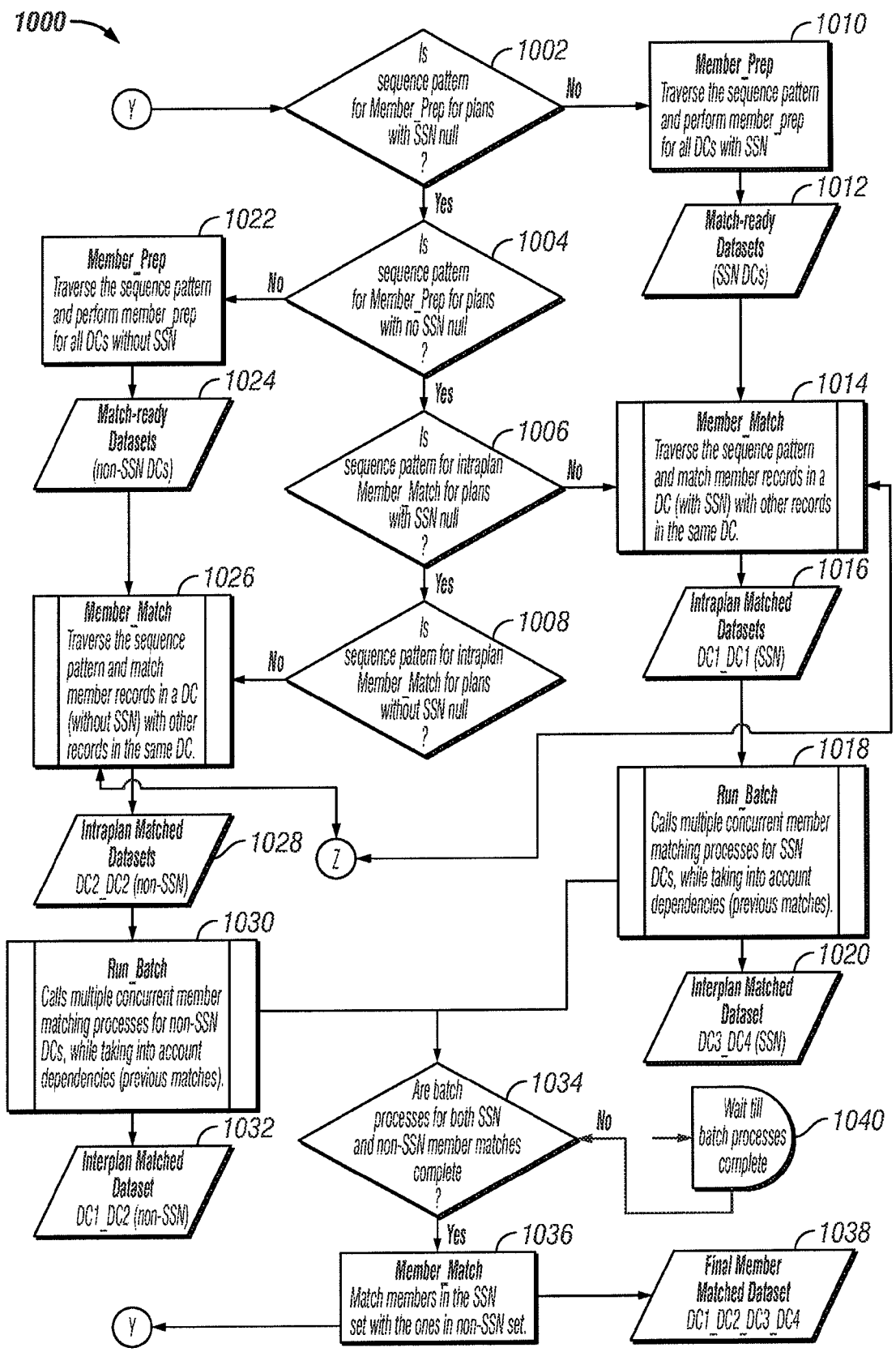
FIG. 10 is a schematic flowchart diagram illustrating one embodiment of a sub-process for preparing the data, performing a preliminary match (intra-plan) search based on member identifiers and performing matches across data sources.

The data source sequence patterns may then be passed to another sub-process 1000 as illustrated in FIG. 10 for executing the various binary member prep processes and matches per the sequence patterns. The sub-process 1000 may return a dataset comprising data records matched to members or individuals. A new Xwalk dataset may then be generated 920. In a further embodiment, one or more reports may be created 924.

In one embodiment, the "Current" XWalk 910 may be applied to the data from the health plans to identify members that have already been matched at the beginning of each run. The "Current" Xwalk (XWalk as of previous run) may be updated with the newly generated UID⇆MemberID entries from the current run's member matching processes (Execute Flow process 914) to create 916 the "New" Xwalk. For the next run, the "New" Xwalk may be converted into "Current" XWalk by the "Accept" process 812.

FIG. 10 is a schematic flowchart diagram illustrating one embodiment of a sub-process 1000 for performing a preliminary match search based on social security numbers or member identifiers. In a specific embodiment, FIG. 10 may be an elaboration of the Execute_Flow process 914 illustrated and described in FIG. 9. In one embodiment, the Execute_Flow process 914 may use the various sequence patterns provided to it by the Set_Flow process 912.

For example, patterns that may be provided to the Execute Flow process 914 by the Set_Flow process 912 may include a sequence for Member_Prep for plans with SSN. In such an embodiment, the Execute_Flow 914 may start the Member_prep process per the sequence 1010 and provides SSN member-match-ready datasets 1012. In one embodiment, a sequence for Member_Prep for plans without SSN may be generated. In such an embodiment, Execute_Flow may start the Member_prep process per the sequence 1022 and provides non-SSN member-match-ready datasets 1024. In another embodiment, a sequence for Member_Match for plans with SSN may be generated. Execute Flow 914 may start 1018 multiple parallel (based on dependencies) binary member matches in batch mode per the matched sequence provided by Set_Flow 912. In a further embodiment, a sequence for Member_Match for plans without SSN may be generated. In such an embodiment, the Execute Flow process 914 may start 1028 multiple parallel (based on dependencies) binary member matches in batch mode per the matched sequence provided by Set_Flow 912.

In one embodiment, the sub-process 1000 may perform a preliminary search for data records that match according to a social security number and/or a member identification number. If the data records do not contain social security numbers or other identification numbers, the member matching sub-process 1100 ("Z" in FIG. 10) may be called. In one embodiment, the member matching sub-process 1100 may return one or more datasets comprising data records that have been matched to an individual or a member. In a further embodiment, the data resulting from SSN match and non-SSN match are member matched to get the final member matched dataset 1038.

Figure 11A:
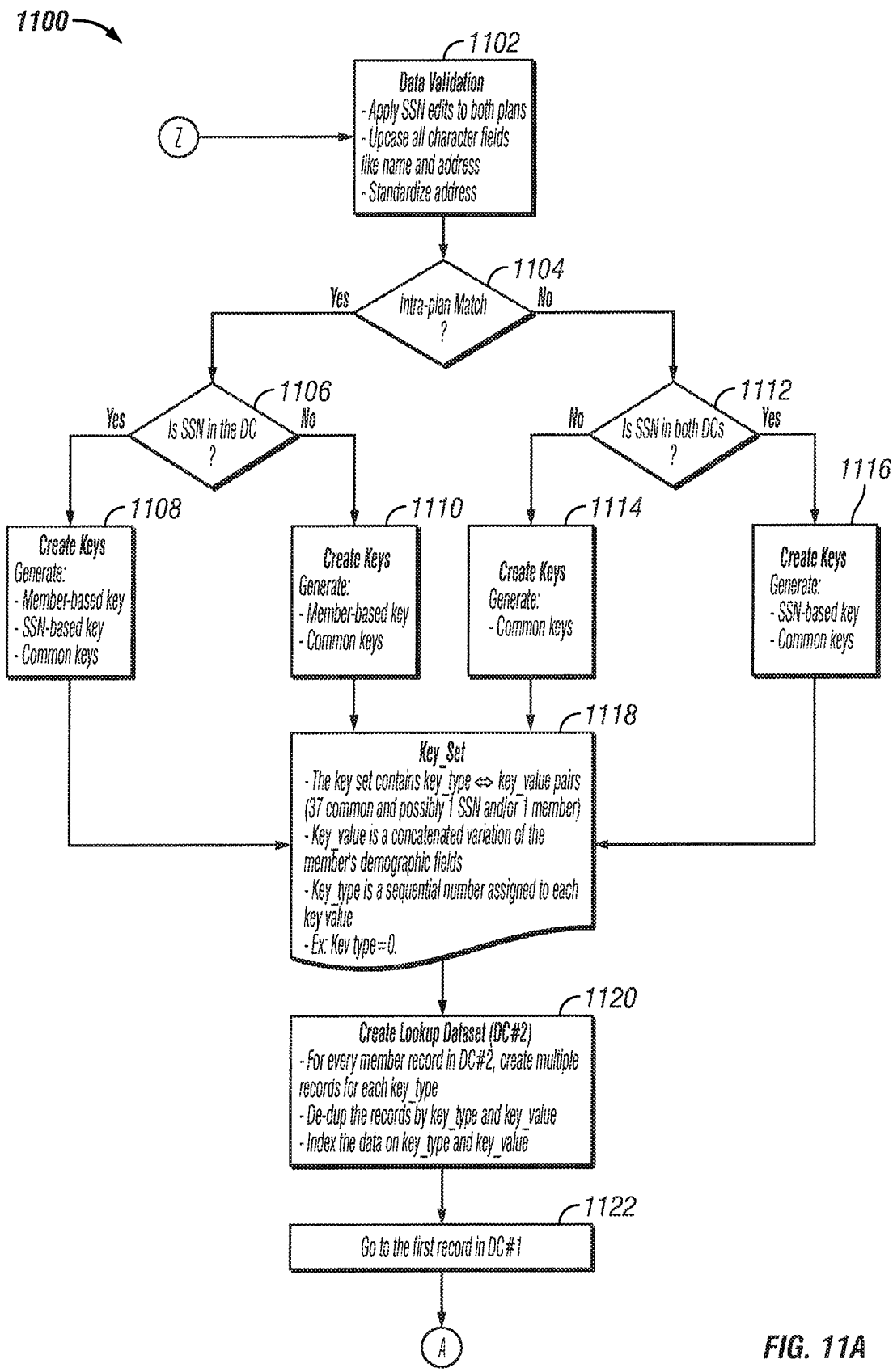
FIGS. 11A-11B are schematic flowchart diagrams illustrating a sub-process for member matching.
Figure 11B:
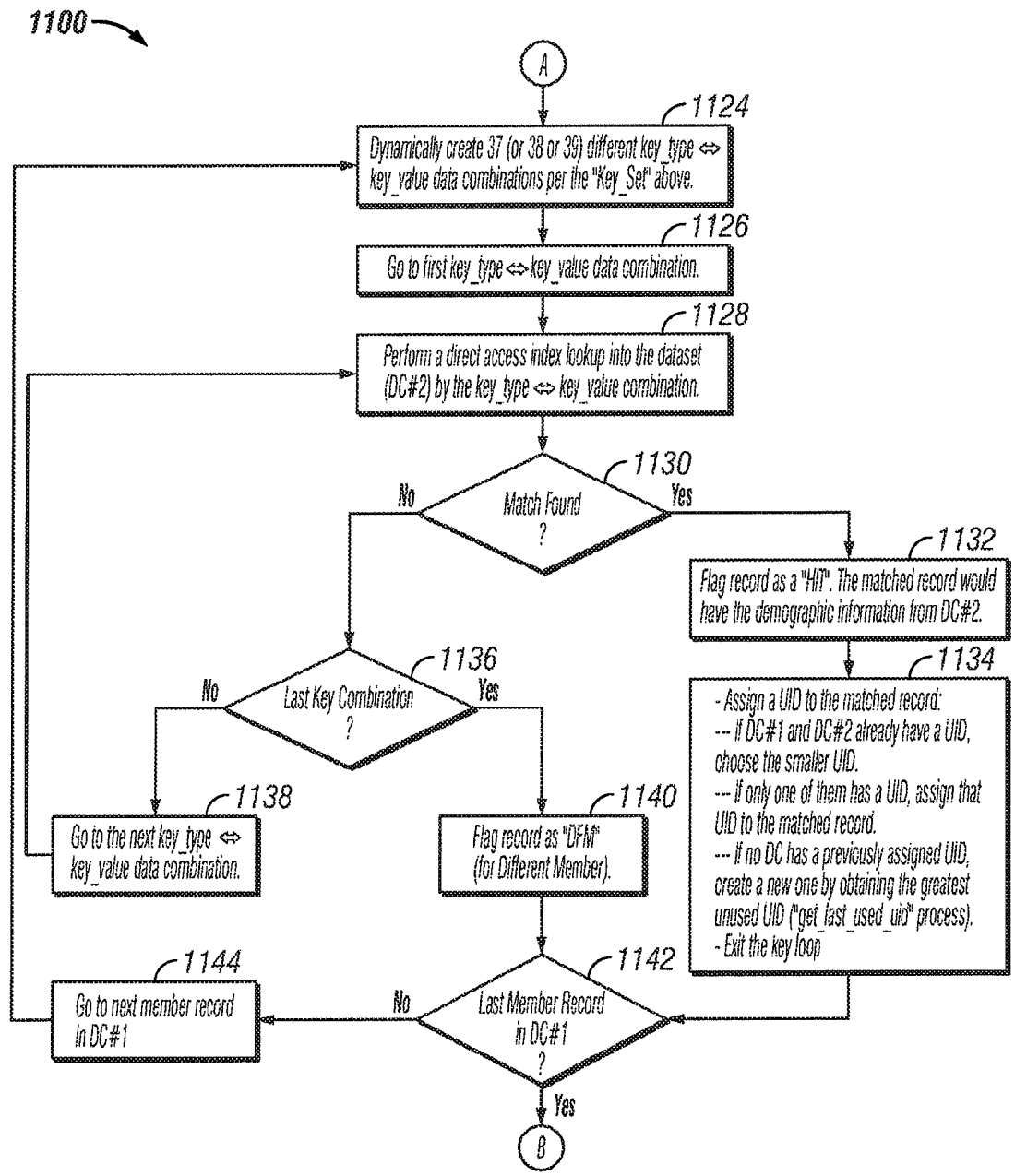
Figure 11B:
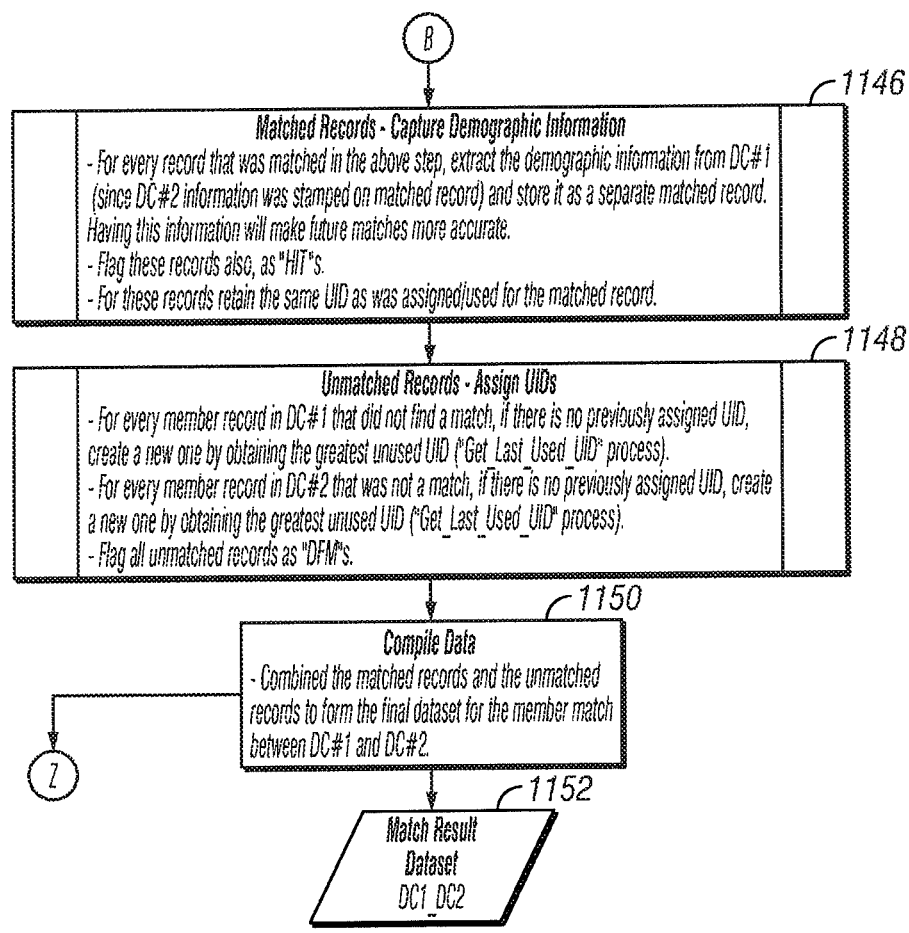

FIGS. 11A-11B are schematic flowchart diagrams illustrating a sub-process 1100 for member matching. In one embodiment, the sub-process 1100 may include a data validation process 1102. The data validation process 1102 may include cleaning the data and/or standardizing the data as described above. In a specific embodiment, data validation may include applying social security number edits, converting all character fields to upper-case, and standardizing addresses. The sub-process 1100 may also include generating a plurality of data keys. In a specific embodiment, thirty nine to forty keys may be generated for each data record. The keys may include member-based keys, social security number-based keys, and/or common keys (See Table 1).

For intra-plan match, if SSN is the DC (Data Contributor), the sub-process 1100 may generate 1108 member-based keys, SSN-based keys, and common keys for each data record; if SSN is not in the DC, member-based keys and common keys may be generated 1110. For inter-plan match to compare data records from different data sources like different health plans, the sub-process 1100 may generate only common keys when no SSNs are available and created SSN-based keys and common keys when SSNs are available. A particular advantage of the invention is that its ability to compare and match data records even when SSN, or plan specific subscriber numbers or member IDs are not available.

The keys generated by one or more processes 1108-1110 and 1114-1116 may be combined 1118 into a key set. For example, a key set may include multiple common keys and one social security number key, or one member-based key such as member IDs or subscriber number specific for individual plan or data contributor. For example, the key set may include between thirty-five and forty separate common keys. In such an embodiment, the common key values may be concatenated variations of the individual's demographic data fields. A key type such as a sequential number may be assigned to each common key so that data common keys may be identified and compared with other common keys of the same type. In a further embodiment, the key type may increase the confidence of member matchings. For example, without key_type, common key_values for different members could be identified as the same member.

In a further embodiment, a lookup data set (DC#2) may be created 1120. The lookup dataset may include multiple records for each key type associated with each data record. The lookup dataset may be further consolidated by identifying and removing duplicate records based on key types and key values. The dataset may then be indexed or sorted according to the key type and/or the key value.

The first data record may then be received 1122. In a particular embodiment, the input adapter 502 may receive the first data record in DC#1. The sub-process 1100 may additionally include dynamically creating 1124 multiple data keys for the first data record in DC#1, according to a preselected set of key types associated with the key set associated with the lookup dataset (DC#2). Each data key generated for the first data set in DC#1 may be compared 1128 with the data keys in the lookup dataset (DC#2) created in 1120. If a match is found, the data records may be 1132 flagged as matching or as a "HIT", and an identification number may be assigned to the matching data records. The matched record would have the demographic information from DC#2. In a further embodiment, the matched record may be 1134 assigned a universal ID (UID): if DC#1 and DC#2 already have a UID, choose the smaller UID; if only one of them has a UID, assign the UID to the matched record; if no DC has a previously UID, created a new one by obtaining the greatest unused UID. If no match is found, the first data record may be flagged as a unique or unmatched data record. Specifically, the data record may be flagged as associated with a new individual or member of a health plan. This process may be repeated iteratively until each data key for each data record has been looked up in the lookup dataset.

Once all of the data records have been looked up, demographic information may be captured 1146 for the matched records from both data sources. This may include extracting the demographic information for each matched data record and storing it as a separate matched record. The demographic information may facilitate future match searches, making the sub-process 1100 more accurate. The unmatched records may be 1148 assigned unique identification numbers, and flagged as unmatched records. This information may be compiled 1150 into a final match result dataset 1152, and returned to the sub-process 1000.

In further embodiments, the apparatus, system and methods described herein may handle matching between three or more datasets associated with three or more distinct plans. In an alternative embodiment, a binary tree matching method may be used to match data records from two separate plans at substantially the same time. These methods may be flexible enough to allow varying identifier fields between datasets, since all datasets may not have common identifier fields. For example, a mapping or association of identifier fields may be generated prior to execution of the methods. In still further embodiments, a set of logical rules for match corroboration or disqualification may be implemented to validate matches. Weighting may also be provided to identify close matches or to provide a level of confidence in the matches. For example, matches based on complex data keys may be assigned a high weighting value, indicating a high level of confidence in the match, while matches based on simple data keys may be assigned a low weighting value, indicating a low level of confidence in the match. This information may be communicated to a user.

The described embodiments may have several advantages. First, the described embodiments are able to match members without the use of social security numbers or plan specific Subscriber Number or Member ID. Second, multiple matching keys in sequence, testing multiple combinations of demographic fields may be used to captures members who move from one location to another, who get married or divorced and change names, who have dual coverage even if demographic information is not identical in both plans, who have data records within one data source and also across data sources. This methodology can have applications in various fields where individuals need to be matched and identified across various similar data sources.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. An apparatus, comprising:
   an input adapter configured to receive a plurality of health care data records from a plurality of health care plans stored in one or more databases, where each of the plurality of health care data records comprises a plurality of field values;
   a processor coupled to the input adapter, the processor configured to:
   generate a data key for each of the plurality of health care data records, where each data key corresponds to a predetermined combination of at least two field values from each of the plurality of health care data records;
   compare a plurality of the generated data keys with each other;
   assign a first unique identifier to each of a plurality of groups of health care data records, where each group of health care data records assigned a first unique identifier comprises at least two health care data records with corresponding data keys that match; and
   assign a second unique identifier to each of a plurality of groups of health care data records, where each group of health care data records assigned a second unique identifier comprises at least two health care data records with corresponding data keys that do not match; and
   an output adapter coupled to the processor, the output adapter configured to produce an output in response to the comparison result.

2. The apparatus of claim 1, wherein the processor is further configured to:
   arrange the plurality of health care data records into an organized sequence based on at least one of: a size of each of the health care data records, the plurality of field values available in each of the health care data records, and the one or more databases on which each of the health care data record resides; and
   generate a sequence pattern of health care data records to compare.

3. The apparatus of claim 2, wherein the generated sequence pattern is decoded to initiate the processor to compare the plurality of health care data records with each other.

4. The apparatus of claim 2, wherein the organized sequence is at least one of: ascending, descending, and temporal-based.

5. The apparatus of claim 1, wherein the processor is further configured to clean the plurality of health care data records before comparing a plurality of the generated data keys with each other.

6. The apparatus of claim 1, wherein the processor is further configured to standardize the plurality of health care data records before comparing a plurality of the generated data keys with each other.

7. The apparatus of claim 6, wherein standardizing the plurality of health care data records comprises assigning a same encrypted value to a plurality of variables which represent a same field value.

8. The apparatus of claim 1, further comprising comparing the plurality of the generated data keys with each other in parallel, comprising:
   sequentially comparing a first data key from a first health care data record with a second data key from a second health care data record in parallel with sequentially comparing a third data key from a third health care data record with a fourth data key from a fourth health care data record.

9. The apparatus of claim 1, wherein each of the first unique identifiers assigned to groups of health care data records with corresponding data keys that match comprise a common identifier associating each of the health care data records in a particular group of health care data record with a unique entity.

10. A system, comprising:
    one or more data storage devices configured to store a plurality of health care data records from one or more health care plans; and
    a server in data communication with the data storage device, the server configured to:
    receive a plurality of health care data records from one or more health care plans stored in one or more databases located on the one or more data storage devices, where each of the first and second health care data records comprises a plurality of field values;
    generate a data key for each of the plurality of health care data records, where each data key corresponds to a predetermined combination of at least two field values from each of the plurality of health care data records;
    compare a plurality of the generated data keys with each other;
    assign a first unique identifier to each of a plurality of groups of health care data records, where each group of health care data records assigned a first unique identifier comprises at least two health care data records with corresponding data keys that match;
    assign a second unique identifier to each of a plurality of groups of health care data records, where each group of health care data records assigned a second unique identifier comprises at least two health care data records with corresponding data keys that do not match; and
    produce an output in response to the comparison result.

11. The system of claim 10, wherein the server is further configured to:
    arrange the plurality of health care data records into an organized sequence based on at least one of: a size of each of the health care data records, the plurality of field values available in each of the health care data records, and the one or more databases on which each of the health care data record resides; and generate a sequence pattern of health care data records to compare based on the organization of the plurality of health care data records.

12. The system of claim 11, wherein the generated sequence pattern is decoded to initiate the server to compare the plurality of health care data records with each other.

13. The system of claim 11, wherein the organized sequence is at least one of: ascending, descending, and temporal-based.

14. The system of claim 10, wherein the server is further configured to clean the plurality of health care data records before comparing a plurality of the generated data keys with each other.

15. The system of claim 10, wherein the server is further configured to standardize the plurality of health care data records before comparing a plurality of the generated data keys with each other.

16. The system of claim 15, wherein standardizing the plurality of health care data records comprises assigning a same encrypted value to a plurality of variables which represent a same field value.

17. The system of claim 10, further comprising comparing a plurality of the generated data keys with each other in parallel, comprising:

sequentially comparing a first data key from a first health care data record with a second data key from a second health care data record in parallel with sequentially comparing a third data key from a third health care data record with a fourth data key from a fourth health care data record.

18. The system of claim 10, wherein each of the first unique identifiers assigned to groups of health care data records with corresponding data keys that match comprise a common identifier associating each of the health care data records in a particular group of health care data record with a unique entity.

19. A tangible computer program product, comprising a non-transitory computer readable storage medium having computer usable program code executable to perform operations comprising:

receiving a plurality of health care data records from one or more health care plans stored in one or more databases located on the one or more data storage devices, where each of the first and second health care data records comprises a plurality of field values;

generating a data key for each of the plurality of health care data records, where each data key corresponds to a predetermined combination of at least two field values from each of the plurality of health care data records;

comparing a plurality of the generated data keys with each other;

assigning a first unique identifier to each of a plurality of groups of health care data records, where each group of health care data records assigned a first unique identifier comprises at least two health care data records with corresponding data keys that match;

assigning a second unique identifier to each of a plurality of groups of health care data records, where each group of health care data records assigned a second unique identifier comprises at least two health care data records with corresponding data keys that do not match; and producing an output in response to the comparison result.

20. The tangible computer program product of claim 19, the operations further comprising:

arranging the plurality of health care data records into an organized sequence based on at least one of: a size of each of the health care data records, the plurality of field values available in each of the health care data records, and the one or more databases on which each of the health care data record resides; and generating a sequence pattern of health care data records to compare.

21. The tangible computer program product of claim 20, wherein the generated sequence pattern is decoded to cause the computer readable storage medium to execute program code to perform the operation of comparing the plurality of health care data records with each other.

22. The tangible computer program product of claim 20, wherein the organized sequence is at least one of: ascending, descending, and temporal-based.

23. The tangible computer program product of claim 19, the operations further comprising cleaning the plurality of health care data records before comparing a plurality of the generated data keys with each other.

24. The tangible computer program product of claim 19, the operations further comprising standardizing the plurality of health care data records before comparing a plurality of the generated data keys with each other.

25. The tangible computer program product of claim 24, wherein standardizing the plurality of health care data records comprises assigning a same encrypted value to a plurality of variables which represent a same field value.

26. The tangible computer program product of claim 19, wherein the operation for comparing a plurality of the generated data keys with each other comprises comparing in parallel, comprising:

sequentially comparing a first data key from a first health care data record with a second data key from a second health care data record in parallel with sequentially comparing a third data key from a third health care data record with a fourth data key from a fourth health care data record.

27. The tangible computer program product of claim 19, wherein each of the first unique identifiers assigned to groups of health care data records with corresponding data keys that match comprise a common identifier associating each of the health care data records in a particular group of health care data record with a unique entity.

28. A method comprising:

receiving a plurality of health care data records from one or more health care plans stored in one or more databases located on the one or more data storage devices, where each of the first and second health care data records comprises a plurality of field values;

generating a data key for each of the plurality of health care data records, where each data key corresponds to a predetermined combination of at least two field values from each of the plurality of health care data records;

comparing a plurality of the generated data keys with each other;

identifying one or more matches between the plurality of generated data keys; and assigning a first unique identifier to each of a plurality of groups of health care data records, where each group of health care data records assigned a first unique identifier comprises at least two health care data records with corresponding data keys that match;

assigning a second unique identifier to each of a plurality of groups of health care data records, where each group of health care data records assigned a second unique identifier comprises at least two health care data records with corresponding data keys that do not match; and producing an output in response to the comparison result.

29. The method of claim 28, further comprising:

arrange the plurality of health care data records into an organized sequence based on at least one of: a size of each of the health care data records, the plurality of field values available in each of the health care data records, and the one or more databases on which each of the health care data record resides; and generating a sequence pattern of health care data records to compare.

30. The method of claim 29, further comprising decoding the generated sequence pattern to initiate comparing of the plurality of health care data records with each other.

31. The method of claim 29, wherein the organized sequence is at least one of: ascending, descending, and temporal-based.

32. The method of claim 28, comprising cleaning the plurality of health care data records before comparing a plurality of the generated data keys with each other.

33. The method of claim 28, comprising standardizing the plurality of health care data records before comparing a plurality of the generated data keys with each other.

34. The method of claim 33, wherein standardizing the plurality of health care data records assigning a same encrypted value to a plurality of variables which represent a same field value.

35. The method of claim 28, wherein the operation for comparing a plurality of the generated data keys with each other compares the data keys in parallel by:

sequentially comparing a first data key from a first health care data record with a second data key from a second health care data record in parallel with sequentially comparing a third data key from a third health care data record with a fourth data key from a fourth health care data record.

36. The method of claim 28, wherein each of the first unique identifiers assigned to groups of health care data records with corresponding data keys that match comprise a common identifier associating each of the health care data records in a particular group of health care data record with a unique entity.

\* \* \* \* \*